(12) United States Patent
Nakajima

(10) Patent No.: US 10,187,828 B2
(45) Date of Patent: Jan. 22, 2019

(54) COMMUNICATION DEVICE AND COMMUNICATION METHOD WITH IMPROVED HANDOVER

(71) Applicant: FUJITSU LIMITED, Kawasaki-shi, Kanagawa (JP)

(72) Inventor: Masaki Nakajima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 232 days.

(21) Appl. No.: 15/013,575

(22) Filed: Feb. 2, 2016

(65) Prior Publication Data

US 2016/0234741 A1 Aug. 11, 2016

(30) Foreign Application Priority Data

Feb. 6, 2015 (JP) ................................ 2015-022572

(51) Int. Cl.
*H04W 36/00* (2009.01)

(52) U.S. Cl.
CPC .... *H04W 36/0079* (2018.08); *H04W 36/0022* (2013.01)

(58) Field of Classification Search
CPC ....................... H04W 36/0022; H04W 36/0055
See application file for complete search history.

(56) References Cited

U.S. PATENT DOCUMENTS

| 2004/0185855 | A1* | 9/2004 | Storm | H04W 76/04 455/445 |
| 2008/0305800 | A1 | 12/2008 | Sharp et al. | |
| 2011/0274085 | A1 | 11/2011 | Geary et al. | |
| 2013/0250916 | A1 | 9/2013 | Aoyagi et al. | |
| 2014/0063175 | A1* | 3/2014 | Jafry | H04M 1/67 348/14.02 |

(Continued)

FOREIGN PATENT DOCUMENTS

| JP | 2002-536890 A | 10/2002 |
| JP | 2012-186855 A | 9/2012 |
| JP | 2013-532404 A | 8/2013 |

OTHER PUBLICATIONS

Office Action dated Nov. 13, 2018, issued in counterpart Japanese Application No. 2015-022572, with English machine translation. (4 pages).

*Primary Examiner* — Feben Haile
(74) *Attorney, Agent, or Firm* — Westerman, Hattori, Daniels & Adrian, LLP

(57) ABSTRACT

A radio communication device includes a memory, and a control circuit coupled to the memory and configured to perform a communication with a first base station based on a first communication protocol for a call, when the call is disconnected, store, in the memory, state information indicating a state of the call before the disconnection, after the disconnection, perform a first search for a second base station which is configured to communicate based on the first communication protocol, when the first search failed, perform a second search for and identify a third base station which is configured to communicate based on a second communication protocol different from the first communication protocol, perform waiting at the third base station, and when the waiting is started, restore the state of the call before the disconnection based on the state information stored in the memory.

16 Claims, 10 Drawing Sheets

(56) References Cited

U.S. PATENT DOCUMENTS

| | | | |
|---|---|---|---|
| 2014/0235227 A1* | 8/2014 | Shiroshima | H04M 3/42323 455/418 |
| 2015/0188727 A1* | 7/2015 | Bruner | H04L 12/4633 370/329 |
| 2016/0007240 A1* | 1/2016 | Belghoul | H04W 36/0022 370/331 |

* cited by examiner

FIG. 3

| NUMBER | SPEECH COMMUNICATION STATE | DIRECTION | HOLD STATE | TYPE | DESTINATION |
|---|---|---|---|---|---|
| 1 | SPEECH COMMUNICATION | OUTGOING | — | VOICE_IP | A |
| 2 | SPEECH COMMUNICATION | INCOMING | ON HOLD | VT_IP | B |
| 3 | IDLE | — | — | — | — |

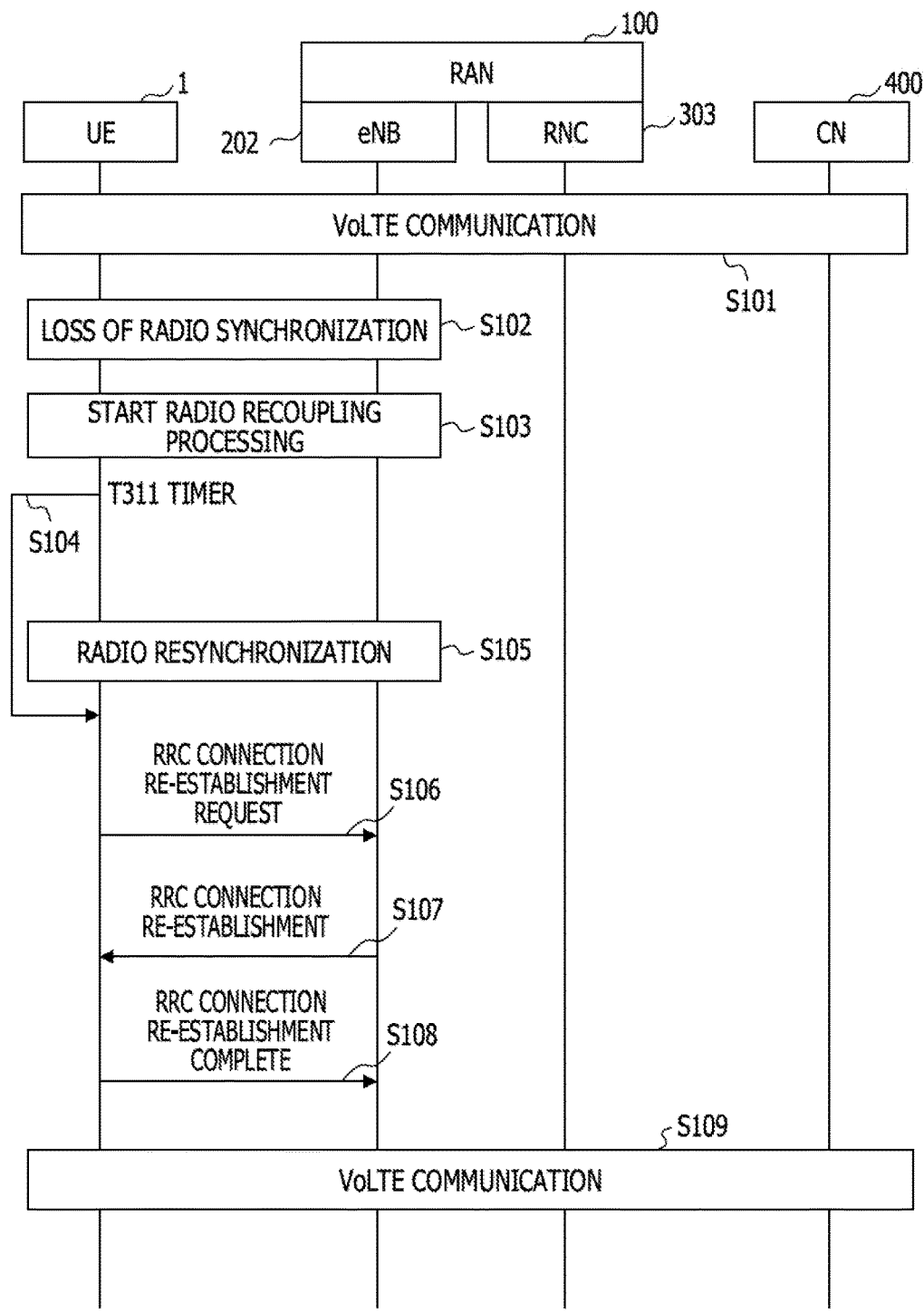

COMMUNICATION DEVICE AND COMMUNICATION METHOD WITH IMPROVED HANDOVER

CROSS-REFERENCE TO RELATED APPLICATION

This application is based upon and claims the benefit of priority of the prior Japanese Patent Application No. 2015-022572, filed on Feb. 6, 2015, the entire contents of which are incorporated herein by reference.

FIELD

The embodiment disclosed herein is related to a communication device and a communication method.

BACKGROUND

A single radio voice call continuity (SRVCC) function is used for voice over long term evolution (VoLTE) providing voice service on long term evolution (LTE), the SRVCC function making a terminal make a transition to a non-LTE network to continue voice service when the radio quality of an LTE network is degraded. VoLTE is a technology for providing voice communication as packet communication.

The following technology is known as another related technology. An evolved node B (eNB) includes a handover control unit. The handover control unit sets an LTE system, a voice over internet protocol (VoIP) bearer, and another communication bearer that is not used for the VoIP, and changes the coupling destination of a coupled mobile apparatus to a 3rd generation (3G) system. At this time, the handover control unit hands over only the VoIP replaced with a circuit switched (CS) bearer in the 3G system by SRVCC on the basis of priority of the VoIP bearer over the other bearer that is not used for the VoIP. Then, the handover control unit does not hand over the other bearer that is not used for the VoIP.

In addition, the following technology is known as another related technology. A handover of a user terminal between a packet switched domain and a circuit switched domain is indicated. A single radio voice call continuity activation event is detected. Control plane signaling radio bearers are suspended so as to be consistent with a serving radio network subsystem relocation procedure. The suspended signaling radio bearers are reset. The suspended signaling radio bearers in the domain to which the handover is performed are resumed. The resuming includes protecting the control plane signaling radio bearers of the domain to which the handover is performed, using a same mapped security key that is used to cipher user plane radio access bearers in the domain to which the handover is performed. Prior art documents include Japanese Laid-open Patent Publication No. 2012-186855 and Japanese Laid-open Patent Publication No. 2013-532404.

SUMMARY

According to an aspect of the embodiment, a radio communication device includes a memory, and a control circuit coupled to the memory and configured to perform a communication with a first base station based on a first communication protocol for a call. When the call is disconnected, the control circuit is configured to store, in the memory, state information indicating a state of the call before the disconnection. After the disconnection, the control circuit is configured to perform a first search for a second base station. The second base station is configured to communicate based on the first communication protocol. When the first search failed, the control circuit is configured to perform a second search for and identify a third base station. The third base station is configured to communicate based on a second communication protocol different from the first communication protocol. The control circuit is configured to perform waiting at the third base station. When the waiting is started, the control circuit is configured to restore the state of the call before the disconnection based on the state information stored in the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of state information;

FIG. 5 is a sequence diagram illustrating speech communication continuation processing within an LTE network;

DESCRIPTION OF EMBODIMENT

In the case of the radio communication devices including the above-described call control technologies, when a handover is performed from an LTE network to a 3G network, for example, SRVCC may not be performed for a call state that is not supported as an object for SRVCC by the radio communication devices or the network side, so that call disconnection may occur.

Figure 1:
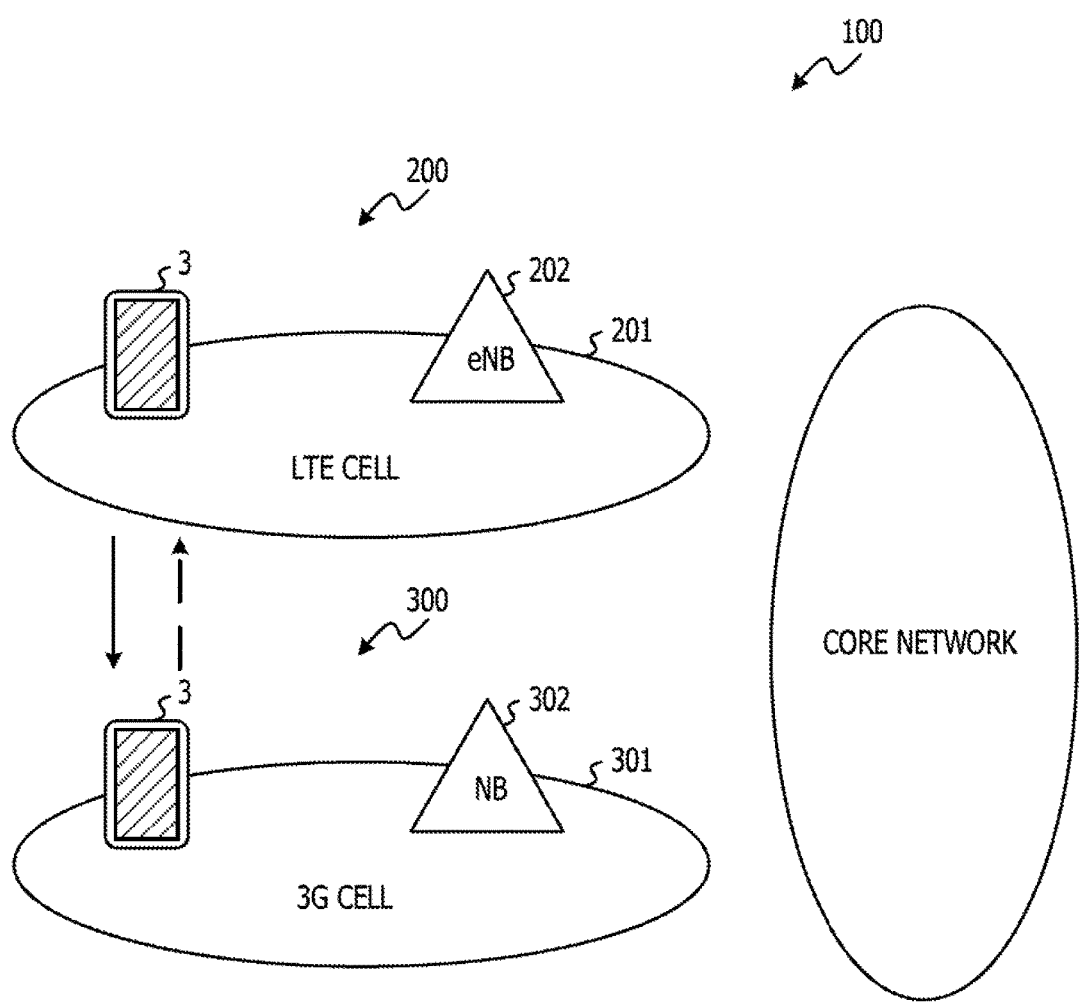
FIG. 1 is a diagram illustrating one embodiment of a radio communication network.

FIG. 1 is a diagram illustrating one embodiment of a radio communication network.

Referring to FIG. 1, description will be made of a handover between different RATs and a call disconnection that occurs at the time of the handover. A handover is processing of changing a base station performing radio communication with a mobile station while the user is moving. RAT is a general term for radio access technologies such as 3G, LTE, and the like. The mobile station refers to a terminal such as a mobile telephone, a smart phone, or the like. In addition, the mobile station will be referred to also as a radio communication device. The base station is a radio station that relays radio communication between an LTE network or a 3G network and the mobile station when the LTE network or the 3G network and the mobile station perform radio communication with each other. The radio communication performed by the LTE network or the 3G network with the mobile station via the base station will also be referred to simply as radio communication between the LTE network or the 3G network and the mobile station. The radio communication will also be referred to simply as communication.

The following description will be made by taking a handover between different RATs as an example in which a mobile station performing radio communication with a base station in an LTE network makes a transition to radio communication with a base station in a 3G network. Suppose that the mobile station is carried by a user and is moving as the user moves.

A radio communication network 100 includes an LTE network 200, a 3G network 300, and a core network (CN) 400.

The LTE network 200 includes an LTE cell 201 and an eNB 202. The LTE network 200 is communicably coupled to the core network 400. The eNB 202 is a base station used in the LTE network 200. The LTE cell 201 represents a communication area covered by the eNB 202.

The 3G network 300 includes a 3G cell 301 and a nodeB (NB) 302. The 3G network 300 is communicably coupled to the core network 400. The NB 302 is a base station used in the 3G network 300. The 3G cell 301 represents a communication area covered by the NB 302.

The core network 400 is communicably coupled to the LTE network 200 and the 3G network 300. The core network 400 is a circuit that communicates high volumes of data.

As illustrated in FIG. 1, when a radio communication device 3 has moved from the LTE cell 201 to the 3G cell 301, and a state of radio communication of the radio communication device 3 with the LTE network 200 is degraded, the radio communication device 3 changes the radio communication of the radio communication device 3 to radio communication using the 3G network 300 to continue voice service. At this time, the radio communication device 3 and the radio communication network 100 perform a handover using an SRVCC function, for example.

SRVCC function support requirements differ for each Release of third generation partnership project (3GPP). Hence, when Releases of 3GPP in the radio communication device 3 and the radio communication network 100 are different from each other, call states in which the SRVCC function supports the continuity of voice service also differ. Thus, SRVCC may not be started at a time of call disconnection, so that call disconnection may directly occur.

Incidentally, when Releases of 3GPP in the radio communication device 3 and the radio communication network 100 are different from each other, call states supported by the SRVCC function of the radio communication network 100 may be fewer than call states supported by the SRVCC function of the radio communication device 3, for example. In addition, when Releases of 3GPP in the radio communication device 3 and the radio communication network 100 are different from each other, call states supported by the SRVCC function of the radio communication device 3 may be fewer than call states supported by the SRVCC function of the radio communication network 100, for example. The following description will be made supposing that call states supported by the SRVCC function of the radio communication network 100 are fewer than call states supported by the SRVCC function of a radio communication device 3.

Call states include for example calls on hold, calls being initiated, calls used for emergency notifications, and the like. A call being initiated will be referred to also as an initiation-in-progress call or an establishment-in-progress call. A call used for an emergency notification will be referred to also as an emergency call or a speech-communication-in-progress call.

A radio communication device 1 according to an embodiment improves the convenience of the user by having a function of automatically restoring a call state before a call disconnection when the call disconnection occurs because the SRVCC function support requirements in the radio communication device 1 and the radio communication network 100 are different from each other. In addition, when simply a loss of radio synchronization is caused by a degradation in radio quality of the radio communication device 1 and the radio communication network 100, and thus a call disconnection occurs, the radio communication device 1 according to the embodiment can improve the convenience of the user by automatically restoring a call state before the call disconnection in recovering the radio quality.

The following description will be made by taking as an example processing of the radio communication device 1 when a call disconnection occurs because the SRVCC function support requirements in the radio communication device 1 and the radio communication network 100 are different from each other.

Figure 2:
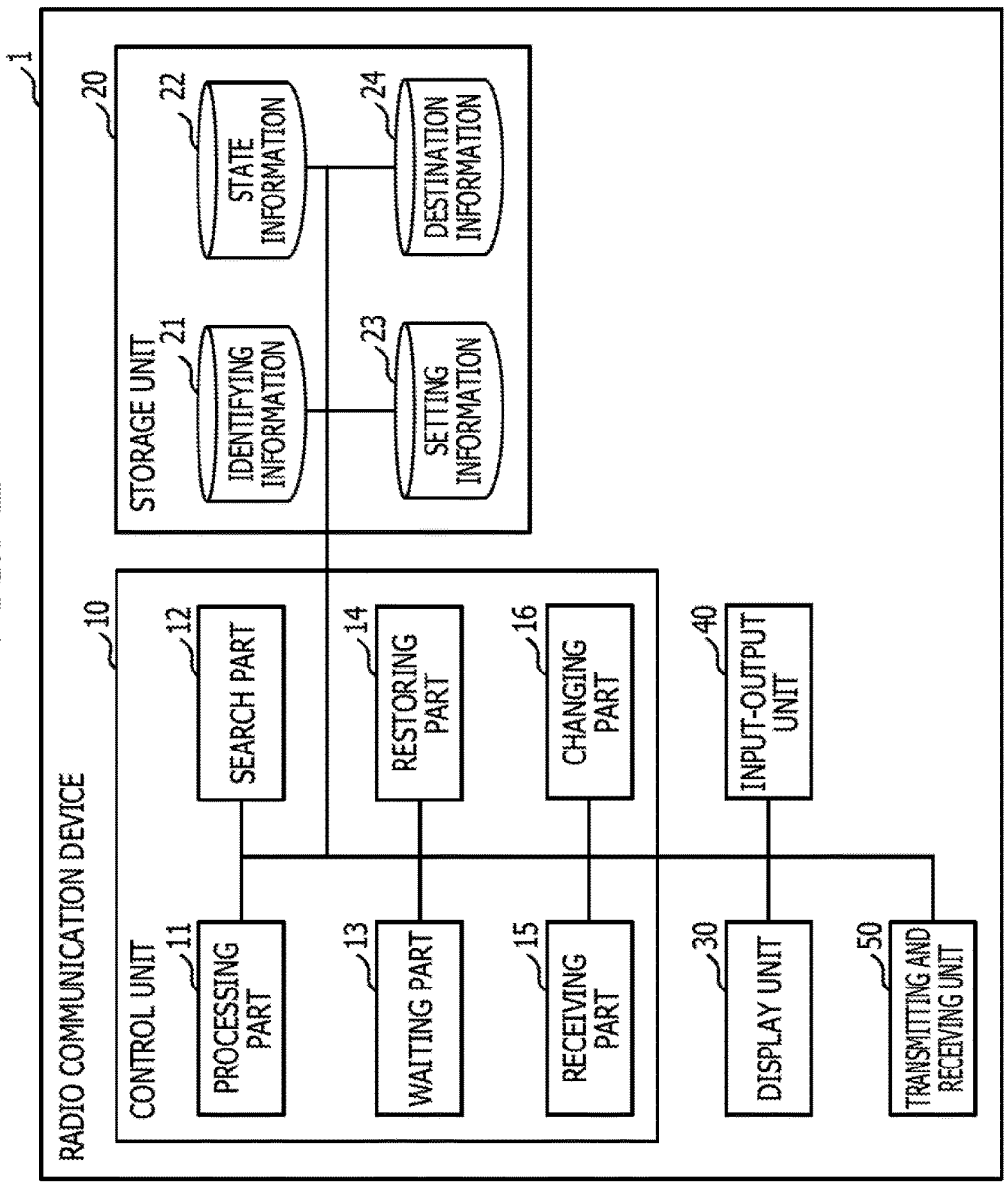
FIG. 2 is a functional block diagram illustrating one embodiment of a radio communication device.

FIG. 2 is a functional block diagram illustrating one embodiment of a radio communication device.

The radio communication device 1 according to the embodiment will be described with reference to FIG. 2.

The radio communication device 1 includes a control unit 10, a storage unit 20, a display unit 30, an input-output unit 40, and a transmitting and receiving unit 50. Radio communication devices 1 to 3 are for example a computer device 500 to be described later.

The control unit 10 includes a processing part 11, a search part 12, a waiting part 13, a restoring part 14, a receiving part 15, and a changing part 16. The storage unit 20 stores information including identifying information 21, state information 22, setting information 23, and destination information 24.

The identifying information 21 stores identifying information of the user which identifying information is to be used at a time of position registration. Then, the identifying information of the user is transmitted from the radio communication device 1 to the radio communication network 100 together with a position registering request at the time of position registration. The identifying information of the user is for example an international mobile subscriber identity (IMSI).

Information stored by the state information 22 will be described later with reference to FIG. 3. When a call disconnection occurs due to a loss of radio synchronization or the like, the radio communication device 1 stores a call state at the time in the state information 22. Thus, after radio resynchronization, the radio communication device 1 refers to the call state stored in the state information 22, and restores the disconnected call. The radio resynchronization refers to synchronization of one of base stations belonging to the radio communication network 100 with the radio communication device 1 after the call disconnection. At this time, the radio communication device 1 may be synchronized with a base station other than a base station in synchronism with the radio communication device 1 before the call disconnection.

The setting information 23 stores first setting information storing a setting as to whether to put the call on hold or put the call into speech communication after establishing the call automatically after the call disconnection. Further, the setting information 23 stores second setting information storing a setting as to whether or not to restore the call state of an incoming call. In the following description, the first setting information will be referred to also as the first setting information stored in the storage unit 20. The second setting information will be referred to also as the second setting information stored in the storage unit 20.

The destination information 24 stores the destination of a radio communication device as a communication destination. The destination information 24 may for example store the telephone numbers of a plurality of radio communication devices. The following description will be made supposing that the destination information 24 stores one or more telephone numbers registered in a telephone directory in the radio communication device 1.

The display unit 30 displays information input from the control unit 10. The input-output unit 40 receives the input of information from the user and a coupled device. In addition, the input-output unit 40 outputs information output from the control unit 10 to the coupled device. The transmitting and receiving unit 50 receives information from a communicably coupled device. Further, the transmitting and receiving unit 50 transmits information to the communicably coupled device.

The processing part 11 performs processing of storing a call state before a call disconnection in the storage unit 20. Further, the processing part 11 performs processing of storing the call state and the destination of the call in association with each other in the storage unit 20. When the call disconnection occurs, the processing part 11 may store the call state before the call disconnection and the destination of the call in association with each other in the storage unit 20. In addition, each time the call state changes, the processing part 11 may store the present call state and the destination of the call in association with each other in the storage unit 20. Thus, when the call disconnection occurs, the storage unit 20 is in a state of storing the state information 22 associating the call state before the call disconnection with the destination of the corresponding call. Then, the storage unit 20 retains the state information 22 at least until the state information 22 is referred to in disconnected call restoration processing to be described later.

FIG. 3 is a diagram illustrating an example of state information.

Referring to FIG. 3, description will be made of information including call states and destinations stored in the state information 22.

The state information 22 is information indicating call states of the radio communication device 1. The state information 22 stores a number, a speech communication state, a direction, a hold state, a type, and a destination in association with each other.

Numbers are identifiers for identifying respective records of the state information 22. The respective records store information indicating the states of calls as objects identified by the respective numbers. In the following description, a call as an object identified by a number will also be referred to simply as an object call.

A speech communication state is information indicating in which of states the object call is, the states including a process of speech communication, a process of being established, a process of being idle, and the like. The process of speech communication represents a period from the establishment of the speech communication to an end of the call. The process of being established represents a period from the transmission of the call to the establishment of the speech communication. The process of being idle represents times other than the process of speech communication and the process of being established. In the following description, a call in the process of speech communication will be referred to also as a speech-communication-in-progress call. A call in the process of being established will be referred to also as an establishment-in-progress call. In addition, a call in the process of being idle will be referred to also as an idle call.

A direction is information indicating whether the radio communication device 1 is transmitting the object call or receiving the object call. The transmission indicates that the radio communication device 1 is transmitting the call. The reception indicates that the radio communication device 1 is receiving the call. The call being transmitted will be referred to also as an outgoing call. The call being received will be referred to also as an incoming call.

A hold state is information indicating whether or not the object call is on hold. Being on hold indicates that the call is on hold. Being on hold indicates that speech communication is put on hold during the speech communication. In the following description, the call on hold will be referred to also as an on-hold call.

A type is information indicating whether the object call is a voice call or a video call in which an image or a moving image and sound are communicated at the same time. Voice_IP indicates that the object call is a voice call. VT_IP indicates that the object call is a video call.

A destination indicates the destination of the object call. The destination is the telephone number of a radio communication device as the transmission destination of the call or the like. In the following description, the radio communication device as the transmission destination of the call will be referred to also as a radio communication device 2.

The following description will be made of the call states indicated by the information stored in the respective records of the state information 22.

A call identified by a number 1 indicates that speech communication is established by the call transmitted from the radio communication device 1 to the radio communication device 2 at a destination identified by a destination A, and that voice communication is being performed. Therefore, the information stored in the record identified by the number 1 indicates that the call state is a state of speech communication in progress which state indicates a process of speech communication. In the following description, a state in which the information indicating that the call state is a state of speech communication in progress is stored in the state information 22 will be referred to also as a state in which the state of speech communication in progress is stored in the storage unit 20 or a state in which the state of speech communication in progress is stored in the state information 22.

A call identified by a number 2 indicates that video speech communication is established by the call transmitted from the radio communication device 2 at a destination identified by a destination B to the radio communication device 1, and that the call is thereafter put on hold. Therefore, the information stored in the record identified by the number 2 indicates that the call state is an on-hold state indicating a process of being on hold. In the following description, a state in which the information indicating that the call state is an on-hold state is stored in the state information 22 will be referred to also as a state in which the on-hold state is stored in the storage unit 20, or a state in which the on-hold state is stored in the state information 22.

Information stored in a record identified by a number 3 indicates that the call state is an idle state indicating a process of being idle. In the following description, a state in which the information indicating that the call state is an idle state is stored in the state information 22 will be referred to also as a state in which the idle state is stored in the storage unit 20, or a state in which the idle state is stored in the state information 22.

Though not illustrated in the figure, a record of the state information 22 may store for example "4" as a number, "being established" as a speech communication state, "outgoing" as a direction, "−" as a hold state, "voice_IP" as a type, and "C" as a destination. In this case, a call identified by the number 4 indicates that voice communication is being established by the call transmitted from the radio communication device 1 to the radio communication device 2 at the destination identified by the destination C. Therefore, the information stored in the record identified by the number 4 indicates that the call state is a state of establishment in progress indicating the process of being established. In the following description, a state in which the information indicating that the call state is a state of establishment in progress is stored in the state information 22 will be referred to also as a state in which the state of establishment in progress is stored in the storage unit 20, or a state in which the state of establishment in progress is stored in the state information 22.

Description will be made with reference to FIG. 2.

When a call disconnection occurs, the search part 12 searches for a communicable base station. The communicable base station is a base station that provides good radio quality in communication with the radio communication device 1. At this time, the search part 12 may search for a base station that provides best radio quality in communication with the radio communication device 1.

When a handover is performed from a first communication network to a second communication network, and a call disconnection occurs, the search part 12 searches for a communicable base station. The first communication network and the second communication network are communication networks whose RATs are different from each other. When the first communication network is the LTE network 200, the second communication network is the 3G network 300, for example. When the first communication network is the 3G network 300, the second communication network is the LTE network 200, for example. Thus, when the call disconnection occurs without SRVCC being started, the search part 12 finds a communicable base station to make the waiting part 13 wait at the found base station.

The waiting part 13 waits at the communicable base station found by the search part 12. In the following description, suppose that in the LTE network 200 and the 3G network 300, cooperative position registration in which 3G position registration is performed in cooperation when the radio communication device 1 performs LTE position registration has been performed using correspondence relation between an LTE position registration area and a 3G position registration area.

Incidentally, when the cooperative position registration has not been performed, the waiting part 13 may perform position registration with a home subscriber server (HSS) of the coupled LTE network 200 or a home location register (HLR) of the coupled 3G network 300, and wait at the communicable base station found by the search part 12. The HSS is a database that manages user information such as mobile telephone numbers, terminal identification numbers, and the like in the LTE network 200. The HLR is a database that manages user information such as mobile telephone numbers, terminal identification numbers, and the like in the 3G network 300.

When the waiting part 13 starts waiting after the occurrence of the call disconnection, the restoring part 14 restores the call state stored in the storage unit 20. At this time, when the waiting part 13 starts waiting after the occurrence of the call disconnection, and a hold state indicating a process of being on hold is stored in the storage unit 20, the restoring part 14 transmits a call to a destination associated with the hold state, and puts the call on hold after the establishment of the call.

When the waiting part 13 starts waiting after the occurrence of the call disconnection, and a state of speech communication in progress or a state of establishment in progress is stored in the storage unit 20 and further an on-hold state is stored in the storage unit 20, the restoring part 14 transmits a call to a destination associated with the on-hold state, and puts the call on hold after the establishment of the call. Then, the restoring part 14 transmits a call to a destination associated with the state of speech communication in progress or the state of establishment in progress which state is stored in the storage unit 20.

When the restoring part 14 transmits the call to the destination associated with the on-hold state, and puts the call on hold after the establishment of the call, the restoring part 14 may put the call on hold after notifying the user of the radio communication device 2 at the destination that the call is to be put on hold. Further, when the restoring part 14 transmits the call to the destination associated with the on-hold state, and puts the call on hold after the establishment of the call, the restoring part 14 may put the call on hold after notifying the user of the radio communication device 1 that the call is to be put on hold.

After the restoring part 14 transmits the call to the destination associated with the on-hold state and establishes the call, the restoring part 14 may set the state of the call to a call state set in the first setting information stored in the storage unit 20. When a setting for putting the call on hold is stored in the first setting information, the restoring part 14 sets the call in an on-hold state after the establishment of the call. In addition, when a setting for putting the call into speech communication is stored in the first setting information, the restoring part 14 sets the call in a state of speech communication in progress after the establishment of the call.

When a call disconnection of a received call occurs, and a setting for restoring the call state of the received call is made in the second setting information stored in the storage unit 20, the restoring part 14 restores the call state of the received call. In addition, when the call disconnection of the received call occurs, and a setting for not restoring the call state of the received call is made in the second setting information stored in the storage unit 20, the restoring part 14 does not restore the call state of the received call.

When the call disconnection of the received call occurs, and destinations stored in the storage unit 20 include a destination of a caller of the received call, the restoring part 14 restores the call state of the received call. The destinations stored in the storage unit 20 are destinations stored in the destination information 24, and are for example telephone numbers registered in the telephone directory. The destination of the received call is for example a telephone number.

After the establishment of the call, the receiving part 15 receives an instruction from the user as to whether to put the call on hold or to put the call into speech communication. Then, after the establishment of the call, the restoring part 14 sets the state of the call to the call state received by the receiving part 15. When the receiving part 15 receives the instruction from the user as to whether to put the call on hold or to put the call into speech communication, the receiving part 15 may display information for the selection on the display unit 30. At this time, as illustrated in FIG. 4A, for example, the receiving part 15 may display icons such as "PUT CALL ON HOLD" and "PUT CALL INTO SPEECH COMMUNICATION" or the like on the display unit 30 to receive an input from the user.

Then, the restoring part 14 may change the call state according to the instruction input from the user via the input-output unit 40. At this time, the receiving part 15 may display "PUT CALL ON HOLD" and "PUT CALL INTO SPEECH COMMUNICATION" on the display unit 30 as illustrated in FIG. 4A, and receive a key input of 1 or 2 by the user. Then, when the user inputs 1, the restoring part 14 may put the call on hold. When the user inputs 2, the restoring part 14 may put the call into speech communication.

Figure 4A:
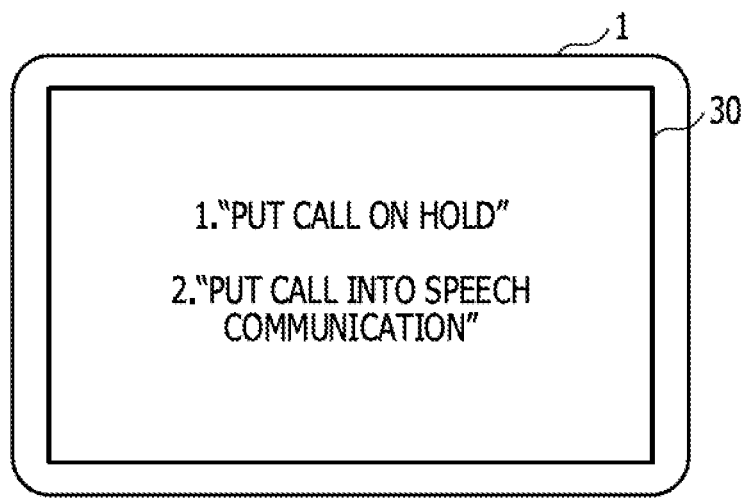
FIG. 4A and FIG. 4B are diagrams illustrating an example of display of information for making selections.

In addition, when the display unit 30 has a function of a touch panel, the receiving part 15 may display "PUT CALL ON HOLD" and "PUT CALL INTO SPEECH COMMUNICATION" on the display unit 30 as illustrated in FIG. 4A, and receive a touch input of the user. Then, when the receiving part 15 receives a touch input corresponding to "PUT CALL ON HOLD," the restoring part 14 may put the call on hold. When the receiving part 15 receives a touch input by the user which touch input corresponds to "PUT CALL INTO SPEECH COMMUNICATION," the restoring part 14 may put the call into speech communication.

When the call disconnection of the received call occurs, the receiving part 15 receives an instruction as to whether or not to restore the call state. When the receiving part 15 receives an instruction to restore the call state after the call disconnection of the received call occurs, the restoring part 14 restores the call state of the received call. When the receiving part 15 receives the instruction as to whether or not to restore the call state, the receiving part 15 may display information for the selection on the display unit 30. At this time, as illustrated in FIG. 4B, for example, the receiving part 15 may display icons such as "RESTORE CALL STATE" and "DO NOT RESTORE CALL STATE" or the like on the display unit 30 to receive an input from the user.

The restoring part 14 may then restore the call state according to the instruction input from the user via the input-output unit 40. At this time, the receiving part 15 may display "RESTORE CALL STATE" and "DO NOT RESTORE CALL STATE" on the display unit 30 as illustrated in FIG. 4B, and receive a key input of 1 or 2 by the user. Then, when the user inputs 1, the restoring part 14 may restore the call state. When the user inputs 2, the restoring part 14 may end speech communication without restoring the call state.

Figure 4B:
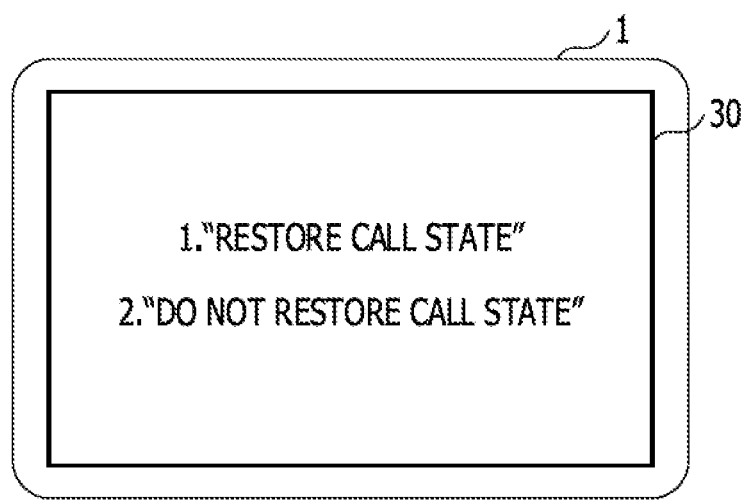

In addition, when the display unit 30 has a function of a touch panel, the receiving part 15 may display "RESTORE CALL STATE" and "DO NOT RESTORE CALL STATE" on the display unit 30 as illustrated in FIG. 4B, and receive a touch input of the user. Then, when the receiving part 15 receives a touch input corresponding to "RESTORE CALL STATE," the restoring part 14 may restore the call state. When the receiving part 15 receives a touch input by the user which touch input corresponds to "DO NOT RESTORE CALL STATE," the restoring part 14 may not restore the call state.

Description will be made with reference to FIG. 2.

The changing part 16 performs a handover from a first communication network in which radio communication is performed according to a first standard to a second communication network in which radio communication is performed according to a second standard, and thus changes the communication network in which to perform radio communication. The first standard is the standard of the LTE network 200, for example. The second standard is the standard of the 3G network 300, for example. Incidentally, the first standard may be the standard of the 3G network 300. In this case, the second standard may be the standard of the LTE network 200.

Figure 6:
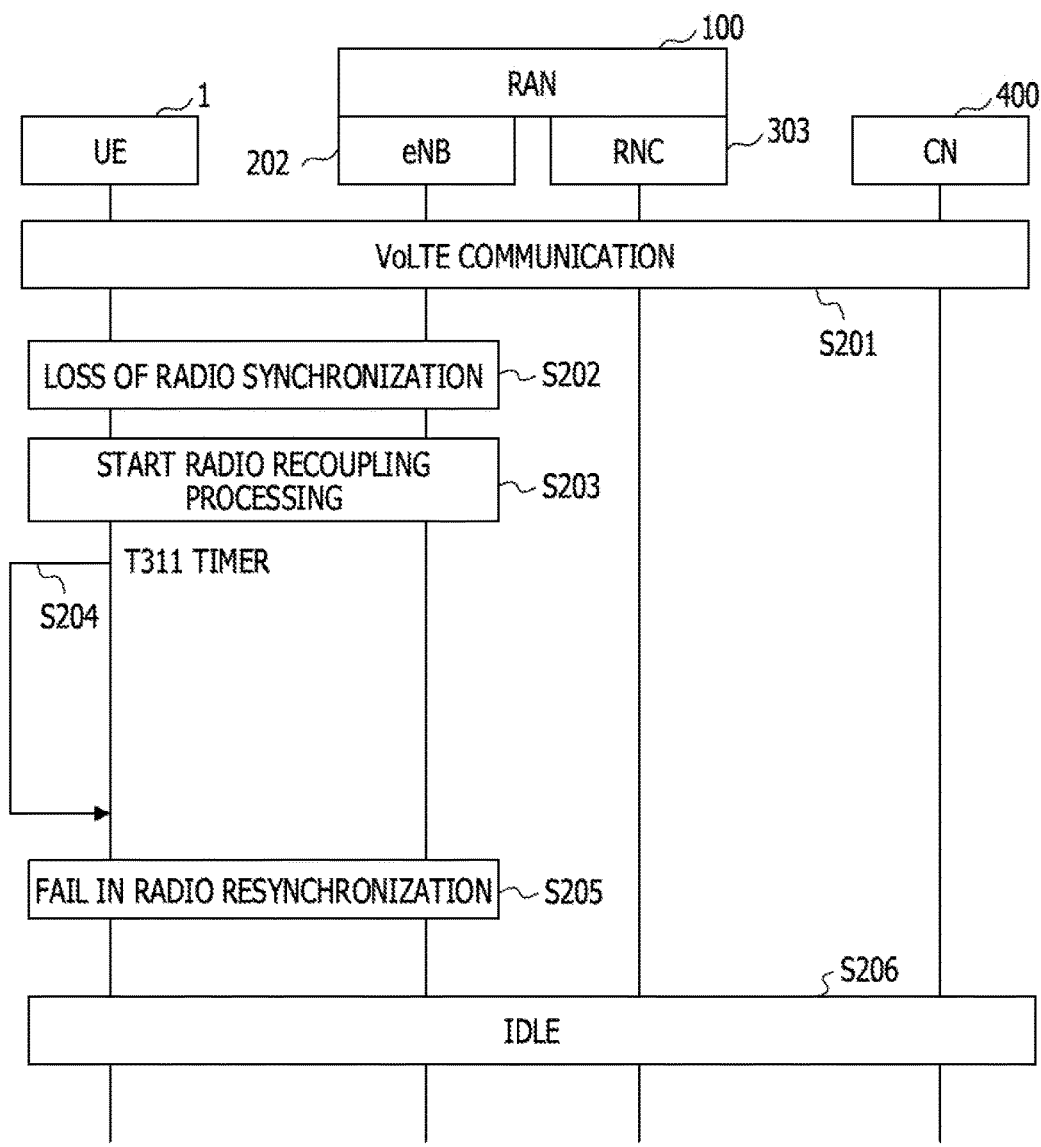
FIG. 6 is a sequence diagram illustrating speech communication continuation processing within an LTE network.

FIG. 5 and FIG. 6 are sequence diagrams illustrating speech communication continuation processing within an LTE network.

Referring to FIG. 5, description will be made of processing in which when a loss of radio synchronization occurs during the VoLTE communication of the radio communication device 1 with the radio communication device 2, the radio communication device 1 performs radio recoupling and resumes VoLTE communication with the radio communication device 2.

Devices represented by respective blocks in FIG. 5 will be described. In FIG. 5, the same devices as the devices described with reference to FIG. 1 and FIG. 2 are identified by the same reference numerals. User equipment (UE) 1 is for example the radio communication device 1. A radio access network (RAN) 100 is for example the radio communication network 100. A radio network controller (RNC) 303 is coupled to the NB 302 in the 3G network 300, and for example controls a handover and relays communication between the NB 302 and the CN 400. The eNB 202 is a node that realizes functions of the RNC 303 with the core in a distributed manner. The UE 1, the eNB 202, and the RNC 303 are for example a computer device 500 to be described later.

In the following description, the UE 1 will be referred to also as the radio communication device 1. Description will be made supposing that the eNB 202 includes the same functions as the RNC 303. In addition, suppose that processing of S101 to S109 is performed by control units of the respective devices.

When a loss of radio synchronization occurs in radio communication with the eNB 202 due to a degradation in radio quality or the like (S102) during the VoLTE communication of the radio communication device 1 with the radio communication device 2 (S101), the radio communication device 1 starts radio recoupling processing (S103).

When the radio communication device 1 starts the radio recoupling processing, the radio communication device 1 starts a timer (S104). The timer is for example a T311 timer. The T311 timer is used at a time of radio recoupling. When radio resynchronization is not completed even after the passage of a time set in T311, the radio communication device 1 performs processing of ending the radio recoupling processing and ending a call. The following description will be made supposing that the radio communication device 1 and the eNB 202 succeed in radio resynchronization.

The radio communication device 1 for example searches for an LTE cell providing good radio quality. The radio communication device 1 then performs radio resynchronization by transmitting a synchronizing signal to an eNB 203 including the found LTE cell providing good radio quality, and obtaining the frequency of a radio wave within the cell to be used for communication, reception timing, and a cell identification (ID) that identifies the eNB 203 (S105). The eNB 203 including the LTE cell providing good radio quality may be the eNB 203 different from the eNB 202 with which radio communication has been performed in S101, for example, the eNB 203 not being illustrated in the figure.

When the radio quality of the cell of the eNB 202 with which radio communication has been performed in S101 is restored after the occurrence of the loss of radio synchronization in S102, the radio communication device 1 may select the eNB 202 with which radio communication has been performed in S101 as the eNB 203 including the LTE cell providing good radio quality. Suppose in the following description that the radio communication device 1 performs radio resynchronization with the eNB 203.

After the radio resynchronization is completed, the radio communication device 1 transmits a radio resource control (RRC) connection re-establishment request to the eNB 203 (S106). When the eNB 203 receives the RRC connection re-establishment request, the eNB 203 transmits an RRC connection re-establishment to the radio communication device 1 (S107). When the radio communication device 1 receives the RRC connection re-establishment, the radio communication device 1 transmits an RRC connection re-establishment complete to the eNB 203 (S108).

After the radio communication device 1 establishes coupling with the eNB 203 by performing the processing of S106 to S108, the radio communication device 1 resumes VoLTE communication with the radio communication device 2 (S109).

As described above, when a loss of radio synchronization occurs, the radio communication device 1 can continue speech communication by VoLTE communication by searching for an LTE cell providing good radio quality and performing radio recoupling with an eNB including the found LTE cell.

Next, referring to FIG. 6, description will be made of processing in which the radio communication device 1 performs radio recoupling processing within the LTE network 200 when a loss of radio synchronization occurs during VoLTE communication with the radio communication device 2, and fails in radio resynchronization. Devices represented by respective blocks in FIG. 6 are the same as the devices represented by the respective blocks in FIG. 5, and therefore description thereof will be omitted.

Suppose in the following description that processing of S201 to S206 is performed by control units of the respective devices.

When a loss of radio synchronization occurs in radio communication with the eNB 202 due to a degradation in radio quality or the like (S202) during the VoLTE communication of the radio communication device 1 with the radio communication device 2 (S201), the radio communication device 1 starts the radio recoupling processing (S203).

When the radio communication device 1 starts the radio recoupling processing, the radio communication device 1 starts a timer (S204). The timer is for example a T311 timer.

When radio resynchronization is not completed even after the passage of a time set in T311, the radio communication device 1 determines that radio resynchronization has failed (S205). Radio resynchronization is not completed for example in a case where an LTE cell providing good radio quality is not found even after the passage of the time set in T311 when the radio communication device 1 searches for an LTE cell providing good radio quality to perform radio resynchronization.

Then, after the radio communication device 1 determines that radio resynchronization has failed, the radio communication device 1 performs call ending processing, and makes a transition to an idle state (S206).

As described above, the radio communication device 1 searches for an LTE cell providing good radio quality when a loss of radio synchronization occurs, and performs call ending processing when an LTE cell providing good radio quality is not found. A call disconnection thus occurs.

In an environment in which such a loss of radio synchronization can occur, the radio communication device 1 can continue speech communication by changing a radio communication destination from the LTE network 200 to the 3G network 300 using the SRVCC function, and thus performing a handover. However, in a case where call states supported in the SRVCC function of the radio communication network 100 are fewer than call states supported in the SRVCC function of the radio communication device 1, a call disconnection may occur without SRVCC being started even when there is a 3G cell 301 providing good radio quality.

When a call disconnection occurs in the above-described case, the radio communication device 1 according to the embodiment resumes speech communication by using the 3G network 300, and automatically restores a call state before the call disconnection. The radio communication device 1 according to the embodiment thus improves the convenience of the user.

Figure 7:
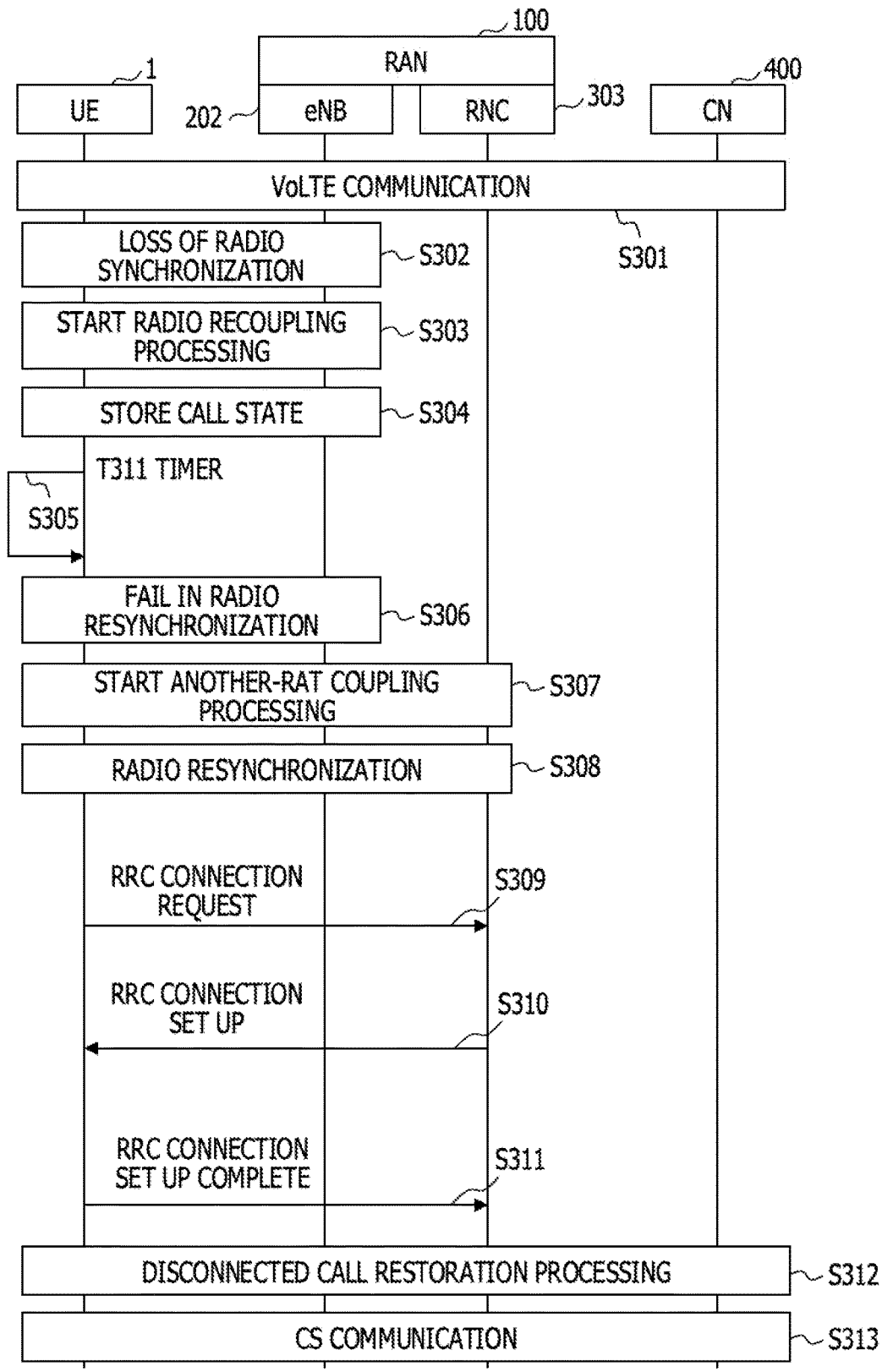
FIG. 7 is a flowchart illustrating recoupling to another radio access technology (RAT)

FIG. 7 is a flowchart illustrating recoupling to another RAT.

Referring to FIG. 7, description will be made of radio communication processing in which, after a call disconnection occurs because call states supported in the SRVCC function of the radio communication device 1 are different from call states supported in the SRVCC function of the radio communication network 100, the radio communication device 1 according to the embodiment automatically restores a call state before the call disconnection. Devices represented by respective blocks in FIG. 7 are the same as the devices represented by the respective blocks in FIG. 5, and therefore description thereof will be omitted.

Suppose in the following description that processing of S301 to S312 is performed by control units of the respective devices.

When a loss of radio synchronization occurs in radio communication with the eNB 202 due to a degradation in radio quality or the like (S302) during the VoLTE communication of the radio communication device 1 with the radio communication device 2 (S301), the radio communication device 1 starts radio recoupling processing (S303).

When the radio communication device 1 detects that a call disconnection is caused by the occurrence of the loss of radio synchronization in S302, the radio communication device 1 stores a call state in the storage unit 20 (S304). At this time, the call state is for example stored in a record of the state information 22 stored in the storage unit 20. The radio communication device 1 then starts a timer (S305). The timer is for example a T311 timer.

The radio communication device 1 searches for an LTE cell providing good radio quality. When radio resynchronization is not completed with no LTE cell providing good radio quality being found even after the passage of a time set in T311, the radio communication device 1 determines that radio resynchronization has failed (S306).

Then, the radio communication device 1 starts another-RAT coupling processing (S307), and searches for a 3G cell providing good radio quality. The following description will be made supposing that the radio communication device 1 has found the 3G cell 301 as a 3G cell providing good radio quality.

The radio communication device 1 then performs radio resynchronization with the NB 302 including the found 3G cell 301 providing good radio quality (S308).

After the radio resynchronization is completed, the radio communication device 1 transmits an RRC connection request to the RNC 303 via the NB 302 (S309). When the RNC 303 receives the RRC connection request, the RNC 303 transmits an RRC connection set up to the radio communication device 1 via the NB 302 (S310). When the radio communication device 1 receives the RRC connection set up, the radio communication device 1 transmits an RRC connection set up complete to the RNC 303 via the NB 302 (S311).

After the radio communication device 1 establishes radio coupling to the NB 302 by performing the processing of S309 to S311, the radio communication device 1 performs disconnected call restoration processing (S312). The disconnected call restoration processing will be described later with reference to FIG. 8 and FIG. 9.

After the disconnected call is restored in the disconnected call restoration processing, the radio communication device 1 performs voice communication by CS communication using the restored call (S313).

As described above, when a call state before a call disconnection is not restored and the call disconnection directly occurs because the call states supported in the SRVCC function of the radio communication device 1 are different from the call states supported in the SRVCC function of the radio communication network 100, the radio communication device 1 can restore the call state by performing the disconnected call restoration processing.

Figure 8:
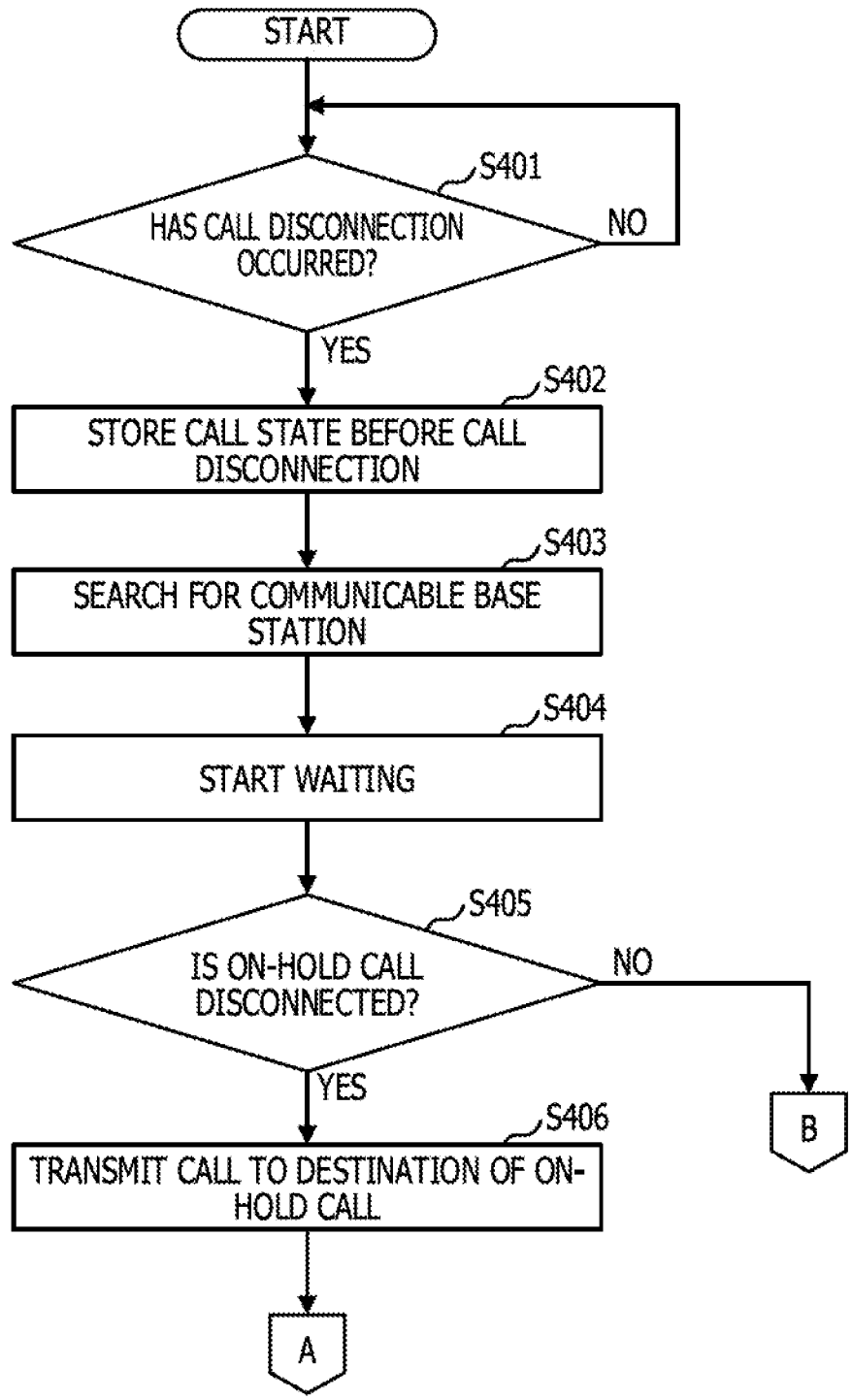
FIG. 8 is a flowchart illustrating disconnected call restoration processing.
Figure 9:
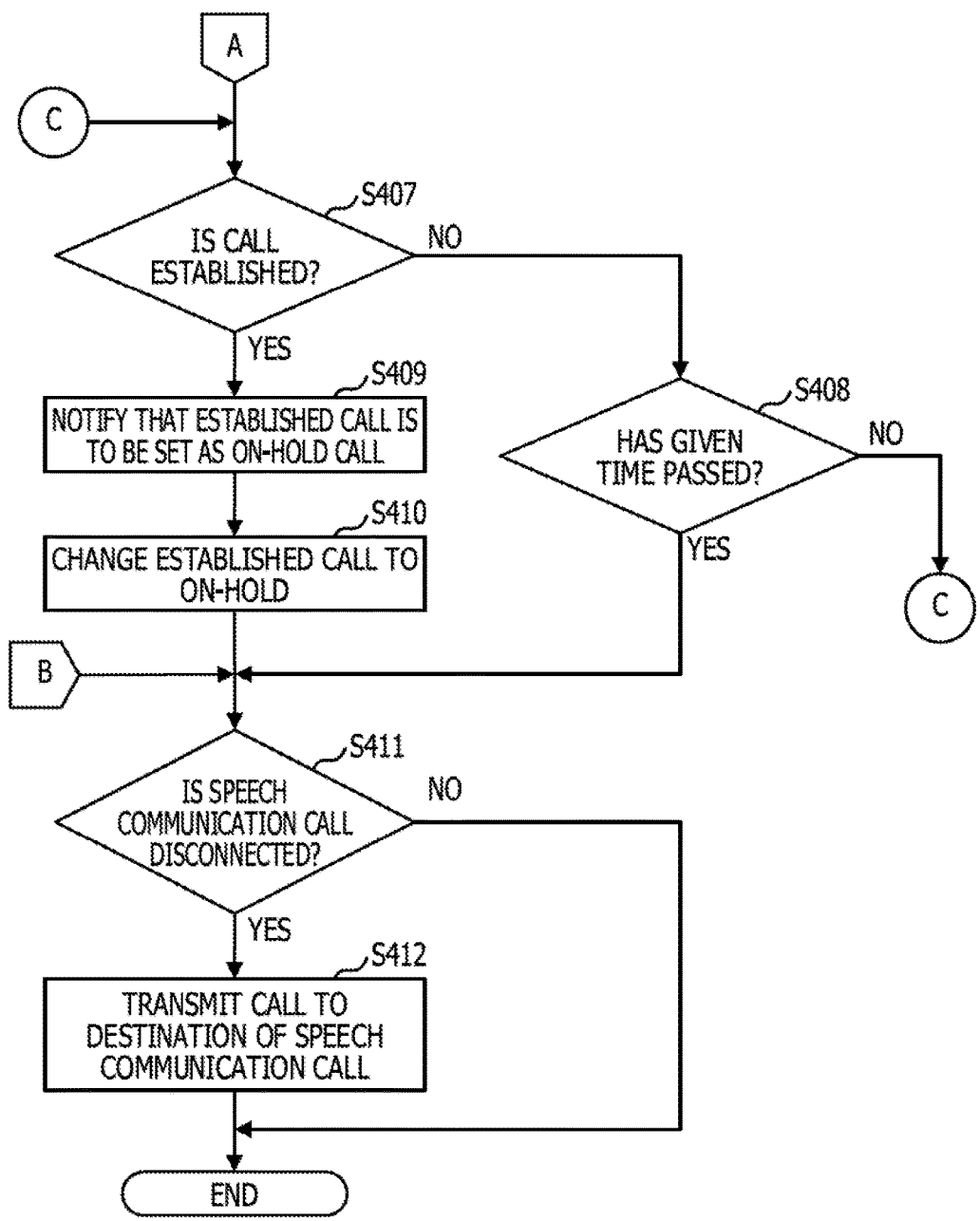
FIG. 9 is a flowchart illustrating disconnected call restoration processing.

FIG. 8 and FIG. 9 are flowcharts illustrating disconnected call restoration processing.

The disconnected call restoration processing of the radio communication device 1 will be described with reference to FIG. 8 and FIG. 9. The following description will be made by taking, as an example, the disconnected call restoration processing in a case where a communication network in which to perform radio communication is changed by performing recoupling from the LTE network 200 to the 3G network 300. Incidentally, the disconnected call restoration processing is applicable also to cases where a call disconnection is caused simply by a degradation in radio quality or the like.

Description will be made with reference to FIG. 8.

The control unit 10 determines whether or not a call disconnection has occurred (S401). When no call disconnection has occurred (No in S401), the control unit 10 repeats the processing of S401. At this time, the radio communication device 1 is performing the processing during the VoLTE communication of S301 in FIG. 7.

When a call disconnection has occurred (Yes in S401), the control unit 10 stores a call state before the call disconnection in the storage unit 20 (S402). At this time, the control unit 10 stores the call state before the call disconnection in the state information 22. The processing of S402 corresponds to the processing of S304 in FIG. 7.

The control unit 10 then searches for a communicable base station (S403), and starts waiting at the found communicable base station (S404). Suppose in this case that the selected base station is the NB 302 of the 3G network 300. The processing of S403 and S404 corresponds to the processing of S305 to S311 in FIG. 7.

Then, the control unit 10 restores the call state stored in the storage unit 20 by performing the processing of S405 to S412.

The control unit 10 determines whether or not an on-hold call is disconnected (S405). The control unit 10 refers to the state information 22. When there is a call in an on-hold state, the control unit 10 determines that an on-hold call is disconnected (Yes in S405), and transmits a call to the radio communication device 2 as the destination of the on-hold call (S406). The control unit 10 refers to the state information 22. When there is no call in an on-hold state, the control unit 10 determines that no on-hold call is disconnected (No in S405), and performs the processing of S411 in FIG. 9 to be described later.

Description will be with reference to FIG. 9.

The control unit 10 determines whether or not the call to the radio communication device 2 as the destination is established (S407). When the call to the radio communication device 2 as the destination is not established (No in S407), the control unit 10 determines whether or not a given time has passed since the transmission of the call to the radio communication device 2 as the destination (S408).

When the given time has not passed in S408 (No in S408), the control unit 10 performs the processing of S407. When the given time has passed in S408 (Yes in S408), the control unit 10 performs the processing of S411 to be described later. The given time used for the determination in S408 may be stored in the setting information 23 illustrated in FIG. 2, for example.

When the call to the radio communication device 2 as the destination is established (Yes in S407), the control unit 10 notifies the radio communication device 2 as the destination that the established call is to be set as an on-hold call (S409). The control unit 10 then changes the established call to an on-hold call (S410). Incidentally, in S409, the radio communication device 1 may notify the user of the radio communication device 1 that the established call is to be set as an on-hold call. The notification that the call is to be set as an on-hold call may be made by for example reproducing a sound stored in the storage unit 20 in advance or displaying one or more of characters and figures on the display unit of the radio communication device.

Next, the control unit 10 determines whether or not a speech communication call is disconnected (S411). The control unit 10 refers to the state information 22. When there is a call in a state of speech communication in progress, the control unit 10 determines that a speech communication call is disconnected (Yes in S411), and transmits a call to the radio communication device 2 as the destination of the speech communication call (S412). Thus, when the call is established, the control unit 10 starts speech communication by CS communication. The control unit 10 then ends the disconnected call restoration processing.

In S411, the control unit 10 refers to the state information 22, and when there is no call in a state of speech communication in progress, the control unit 10 determines that no speech communication call is disconnected (No in S411). The control unit 10 then ends the disconnected call restoration processing.

Figure 10:
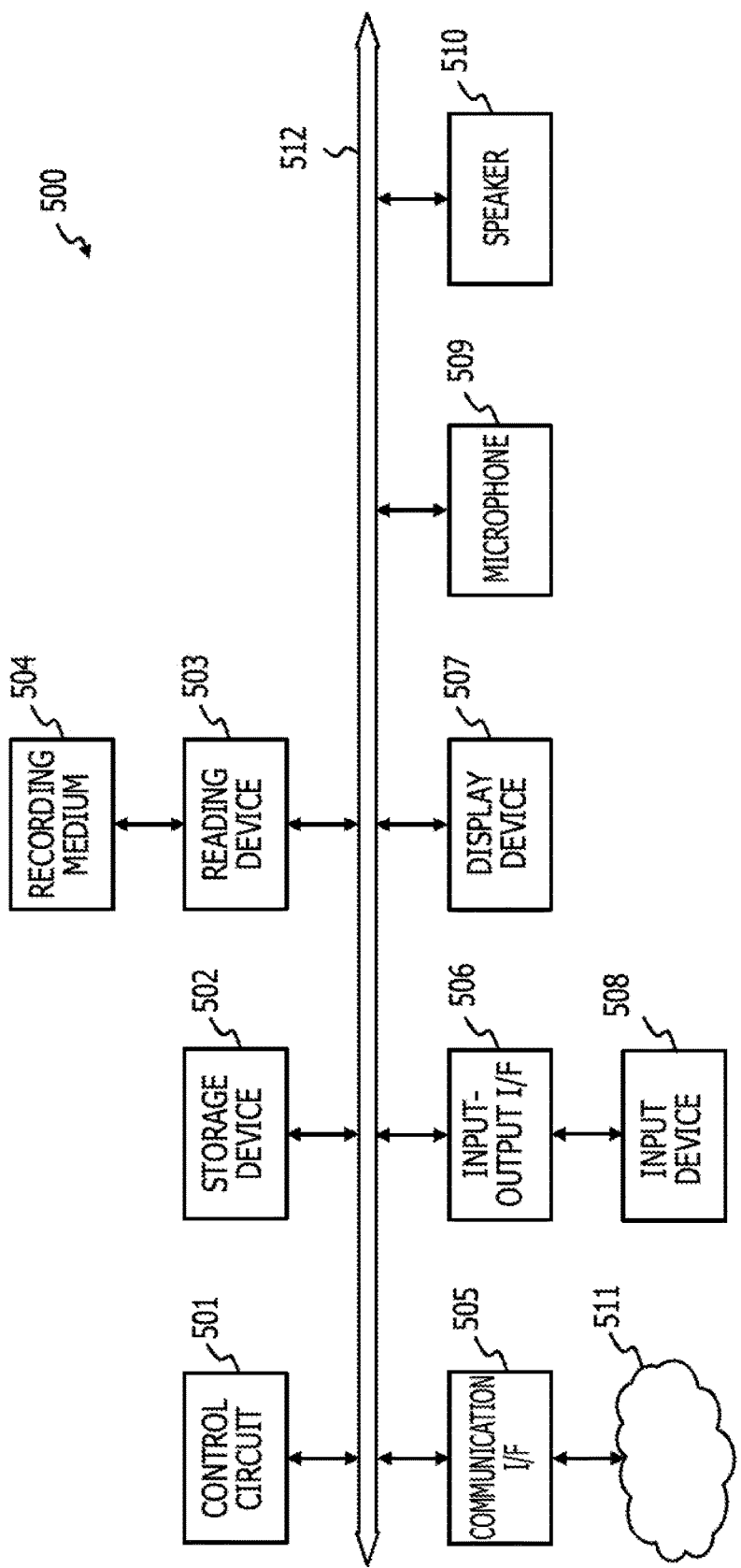
FIG. 10 is a block diagram illustrating one embodiment of a computer device.

FIG. 10 is a block diagram illustrating one embodiment of a computer device.

A configuration of the computer device 500 will be described with reference to FIG. 10.

The computer device 500 in FIG. 10 includes a control circuit 501, a storage device 502, a reading device 503, a recording medium 504, a communication interface 505, an input-output interface 506, a display device 507, an input device 508, a microphone 509, and a speaker 510. The communication interface 505 is coupled to a network 511. The constituent elements are coupled to each other by a bus 512.

The control circuit 501 controls the whole of the computer device 500. The control circuit 501 is for example a processor such as a central processing unit (CPU), a multi-core CPU, a field programmable gate array (FPGA), a programmable logic device (PLD), and the like. The control circuit 501 functions as the control unit 10 in FIG. 2, for example. The control circuit 501 also functions as control units of the eNB 202 and the RNC 303 in FIGS. 5 to 7, for example, the control units not being illustrated in the figures. Incidentally, the identifying information 21, the state information 22, the setting information 23, and the destination information 24 stored in the storage unit 20 in FIG. 2 may be stored in caches of the CPU, the FPGA, and the PLD, for example.

The storage device 502 stores various kinds of data. The storage device 502 is for example a memory such as a read only memory (ROM), a random access memory (RAM), and the like, a hard disk (HD), and the like. The storage device 502 functions as the storage unit 20 in FIG. 2, for example.

In addition, the ROM stores a program such as a boot program or the like. The RAM is used as a work area for the control circuit 501. The HD stores programs, such as an operating system (OS), an application program, firmware, and the like, and various kinds of data.

The storage device 502 stores for example a radio communication program that makes the control circuit 501 function as the control unit 10.

When the radio communication device 1 controls the storage device, the radio communication device 1 reads the radio communication program stored in the storage device 502 into the RAM. By executing the radio communication program read into the RAM by the control circuit 501, the radio communication device 1 performs radio communication processing including one or more of the storing processing, the search processing, the waiting processing, the reception processing, the changing processing, and the disconnected call restoration processing described with reference to FIG. 8 and FIG. 9.

Incidentally, when the control circuit 501 can access the radio communication program via the communication interface 505, the radio communication program may be stored in a storage device possessed by a server on the network 511.

The reading device 503 is controlled by the control circuit 501 to read/write data on the removable recording medium 504. The reading device 503 is for example a floppy disk drive (FDD), a compact disc drive (CDD), a digital versatile disk drive (DVDD), a Blu-ray (registered trademark) disk drive (BDD), a universal serial bus (USB), and the like.

The recording medium 504 stores various kinds of data. The recording medium 504 stores for example the radio communication program. The recording medium 504 may further store the identifying information 21, the state information 22, the setting information 23, and the destination information 24 illustrated in FIG. 2.

The recording medium 504 is coupled to the bus 512 via the reading device 503. The control circuit 501 controls the reading device 503 to thereby read/write the data on the recording medium 504. The recording medium 504 is for example a non-transitory recording medium such as a secure digital (SD) memory card, a floppy disk (FD), a compact disc (CD), a digital versatile disk (DVD), a Blu-ray (registered trademark) disk (BD), a flash memory, and the like.

The communication interface 505 communicably couples the computer device 500 to another device via the network 511. The communication interface 505 functions as the transmitting and receiving unit 50 in FIG. 2, for example. In addition, the communication interface 505 may include an interface having a function of a wireless local area network (LAN) and an interface having a short-range radio communication function. The wireless LAN interface may support Wi-Fi (registered trademark) as a wireless LAN standard, for example. The short-range radio interface may support Bluetooth (registered trademark) as a short-range radio communication standard, for example. The communication interface 505 functions as the transmitting and receiving unit 50 in FIG. 2, for example.

The input-output interface 506 is for example coupled to the input device 508 such as a keyboard, a mouse, a touch panel, and the like. When signals indicating various kinds of information are input from the coupled input device 508 to the input-output interface 506, the input-output interface 506 outputs the input signals to the control circuit 501 via the bus 512. In addition, when signals indicating various kinds of information which signals are output from the control circuit 501 are input to the input-output interface 506 via the bus 512, the input-output interface 506 outputs the signals to the coupled various devices. The input-output interface 506 may for example receive instructions including a selection as to whether to set an established call as a speech communication call or an on-hold call, a selection as to whether or not to restore a call, and the like, the instructions being input by the user. The input-output interface 506 functions as the input-output unit 40 in FIG. 2, for example.

The display device 507 displays various kinds of information. The display unit 30 may display information for receiving input on the touch panel. The display device 507 functions as the display unit 30 in FIG. 2, for example.

The microphone 509 collects sound. The microphone 509 may input the collected sound to an audio digital signal processor (DSP) not illustrated in the figure.

The speaker 510 outputs various kinds of sound such as music, alarm sound, voice, and the like according to requests from the processor. The speaker 510 then notifies the user that an established call is to be set as an on-hold call, for example.

The network 511 is for example a LAN, a radio communication, the Internet, or the like. The network 511 communicably couples the computer device 500 to another device.

As described above, when a call disconnection occurs, the radio communication device 1 according to the embodiment stores a call state before the call disconnection, searches for a communicable base station, starts waiting at the found base station, and then performs the processing of restoring the stored call state. Therefore, the radio communication device 1 can automatically restore the call state before the call disconnection, so that the convenience of the user can be improved.

When the call disconnection occurs, the radio communication device 1 according to the embodiment stores the call state before the call disconnection and the destination of the call in association with each other. When the radio communication device 1 starts waiting after the call disconnection occurs, and an on-hold state indicating a process of being on hold is stored, the radio communication device 1 transmits a call to the destination associated with the on-hold state. Then, the radio communication device 1 puts the call on hold after the establishment of the call. The radio communication device 1 can therefore restore the call in the on-hold state.

The radio communication device 1 according to the embodiment stores the call state and the destination of the call in association with each other. When the radio communication device 1 starts waiting after the occurrence of the call disconnection, the radio communication device 1 refers to the stored call state. Then, when the radio communication device 1 stores a state of speech communication in progress indicating a process of speech communication or a state of establishment in progress indicating a process of being established, and further stores an on-hold state indicating a process of being on hold, the radio communication device 1 transmits a call to the destination associated with the on-hold state, and puts the call on hold after the establishment of the call. Thereafter, the radio communication device 1 transmits a call to the destination associated with the state of speech communication in progress or the state of establishment in progress. The radio communication device 1 can thus perform the disconnected call restoration processing.

In the disconnected call restoration processing, after the establishment of the call, the radio communication device 1 according to the embodiment notifies the user that the call is to be put on hold, and thereafter puts the call on hold. The radio communication device 1 can therefore notify the user that the on-hold call is restored. In addition, the radio communication device 2 as the destination can notify a user responding to calling by the incoming call that the call to which the response is made is set in an on-hold state rather than a state of speech communication in progress.

After the establishment of the call, the radio communication device 1 according to the embodiment receives an instruction from the user as to whether to put the call on hold or to put the call into speech communication. After the establishment of the call, the radio communication device 1 according to the embodiment sets the state of the call to the received call state. The radio communication device 1 can therefore allow the user to select whether or not to restore a speech-communication-in-progress call for which a charge is made.

The radio communication device 1 according to the embodiment stores a setting as to whether to put the call on hold or to put the call into speech communication after the establishment of the call, and sets the state of the call to the call state corresponding to the stored setting after the establishment of the call. Therefore, the radio communication device 1 can allow the user to select in advance whether or not to restore a speech-communication-in-progress call for which a charge is made, for example, and automatically restore a call state desired by the user.

When a call disconnection of a received call occurs, the radio communication device 1 according to the embodiment receives an instruction as to whether or not to restore the call state. Then, when an instruction to restore the call state is received after the call disconnection of the received call occurs, the radio communication device 1 restores the call state of the received call. Therefore, the radio communication device 1 does not automatically restore the call state of a received call for which the user does not need to call back. The convenience of the user can thus be improved.

The radio communication device 1 according to the embodiment stores a setting as to whether or not to restore the call state of a received call. When a call disconnection of a received call occurs, and a setting for restoring the call state of a received call is made as the stored setting, the radio communication device 1 restores the call state of the received call. Therefore, the radio communication device 1 allows a received call for which the user does not need to call back to be set in advance, and does not automatically restore the call state of the set received call. The convenience of the user can thus be improved.

The radio communication device 1 according to the embodiment stores the destination of the radio communication device 2 as a communication destination. When a call disconnection of a received call occurs, and stored destinations include the destination of the caller of the received call, the radio communication device 1 restores the call state of the received call. Therefore, the radio communication device 1 does not automatically restore the call state of a received call by a caller not registered as a destination in the telephone directory, which caller it is highly likely to be unnecessary for the user to call back, for example. The convenience of the user can thus be improved.

When a call disconnection occurs, the radio communication device 1 according to the embodiment stores a call state before the call disconnection, performs a handover from a first communication network in which radio communication is performed according to a first standard to a second communication network in which radio communication is performed according to a second standard, and thus changes the communication network in which to perform radio communication. Then, when a call disconnection occurs at the time of performing the handover from the first communication network to the second communication network, the radio communication device 1 searches for a communicable base station. In addition, after searching for a communicable base station belonging to the second communication network, and starting waiting at the found base station, the radio communication device 1 performs processing of restoring the stored call state. Therefore, when a call disconnection occurs because SRVCC function support requirements in the radio communication device 1 and the radio communication network 100 are different from each other, the radio communication device 1 automatically restores the call state before the call disconnection. The convenience of the user can thus be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication device comprising: a memory; and
   a control circuit coupled to the memory and configured to
   perform a communication with a first base station based on a first communication protocol for a call,
   when the call is disconnected, store, in the memory, state information indicating a state of the call before the disconnection and destination information indicating a destination of the call in association with the state information for the call,
   after the disconnection, perform a first search for a second base station which is configured to communicate based on the first communication protocol,
   when the first search failed, perform a second search for and identify a third base station which is configured to communicate based on a second communication protocol different from the first communication protocol,
   perform waiting at the third base station and restore the state of the call before the disconnection based on the state information stored in the memory, and
   when the waiting is started and the state information in the memory indicates that the state of the call is an on-hold state, execute a connection process to the destination identified by the destination information, and set the call in the on-hold state after restoring the call based on the state information stored in the memory.

2. The communication device according to claim 1, wherein
   the communication is a speech communication, and the state information includes at least one of first information which indicates the speech communication is in a first period from an establishment of the speech communication to an end of the speech communication, second information which indicates the speech communication is in a second period from the transmission of the call to the establishment of the speech communication, and third information which indicates the speech communication is in a third period other than the first period and the second period.

3. The communication device according to claim 2, wherein the state information includes fourth information which indicates whether the call is a voice call or a video call in which an image and sound are communicated.

4. The communication device according to claim 3, wherein the state information includes fifth information which indicates whether the call is transmitted from the communication device or the call is received from the communication device.

5. The communication device according to claim 4, wherein the control circuit is further configured to store destination information indicating a destination of the call in association with the state information for the call.

6. The communication device according to claim 1, wherein the second base station is different from the first base station.

7. The communication device according to claim 1, wherein the first communication protocol is LTE and the second communication protocol is 3G.

8. The communication device according to claim 1, wherein the control circuit is further configured to
store in the memory destination information indicating a destination of the call in association with the state information,
when the state information indicates that the call is in a process of speech communication or the state information indicates that the call is in a process of being established is stored in the memory, put the call in the on-hold state after restoring the call, and transmit the call to the destination when the waiting is started, and
when the state information indicates that the call is in the on-hold state is stored in the memory, and when the waiting is started, transmit the call to the destination.

9. The communication device according to claim 1, wherein the control circuit is further configured to, after restoring the call, put the call in the on-hold state after notifying a user that the call is to be put on hold.

10. The communication device according to claim 1, wherein the control circuit is further configured to
receive an instruction as to whether to put the call in the on-hold state or put the call into speech communication after restoring of the call, and
after restoring the call, put the call in the on-hold state or put the call into speech communication based on the instruction.

11. The communication device according to claim 1, wherein the memory is further configured to store setting information specifying whether to put the call in the on-hold state or to put the call into speech communication after restoring of the call, and wherein the control circuit is further configured to, after restoring of the call, put the call on-hold or put the call into speech communication based on the setting information held in the memory.

12. The communication device according to claim 1, wherein the control circuit is further configured to
receive an instruction as to whether to restore the state of the call when the disconnection of the call occurs, and
where the instruction to restore the state of the call is received, restore the state of the call after the disconnection.

13. The communication device according to claim 1, wherein the memory is further configured to store setting information specifying whether to restore the state of the call, and
wherein the control circuit is further configured to, when the setting information held in the memory specifies restoration of the state of the call, restore the state of the call after the disconnection.

14. The communication device according to claim 1, wherein the memory is further configured to store the destination information identifying another communication device as a communication partner of the communication device, and
wherein the control circuit is further configured to restore the state of the call where a caller device of the call coincides with the another communication device identified by the destination information after the disconnection.

15. The communication device according to claim 1, wherein the second base station is identical to the first base station.

16. A communication method using a communication device including a memory, the method comprising:
performing a communication with a first base station based on a first communication protocol for a call;
when the call is disconnected, storing, in the memory, state information indicating a state of the call before the disconnection and destination information indicating a destination of the call in association with the state information for the call;
after the disconnection, performing a first search for a second base station which is configured to communicate based on the first communication protocol;
when the first search failed, performing a second search for and identifying a third base station which is configured to communicate based on a second communication protocol different from the first communication protocol,
performing waiting at the third base station and restore the state of the call before the disconnection based on the state information stored in the memory; and
when the waiting is started and the state information stored in the memory indicates that the state of the call is an on-hold state, execute a connection process to the destination identified by the destination information, and set the call in the on-hold state after restoring the call based on the state information stored in the memory.

* * * * *